United States Patent
Mellein et al.

(10) Patent No.: US 10,103,965 B2
(45) Date of Patent: Oct. 16, 2018

(54) MEASURING UNIT AND A METHOD FOR MEASURING TRANSMISSION PARAMETERS OF A DEVICE UNDER TEST

(75) Inventors: Heinz Mellein, Haar (DE); Christian Schaefer, Rosenheim (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 751 days.

(21) Appl. No.: 13/823,412

(22) PCT Filed: Sep. 7, 2011

(86) PCT No.: PCT/EP2011/065473
§ 371 (c)(1),
(2), (4) Date: Mar. 14, 2013

(87) PCT Pub. No.: WO2012/038257
PCT Pub. Date: Mar. 29, 2012

(65) Prior Publication Data
US 2013/0188509 A1    Jul. 25, 2013

(30) Foreign Application Priority Data
Sep. 21, 2010  (DE) .................. 10 2010 046 095

(51) Int. Cl.
*H04L 12/26* (2006.01)
*H04B 17/00* (2015.01)
(Continued)

(52) U.S. Cl.
CPC ......... *H04L 43/50* (2013.01); *H04B 17/0085* (2013.01); *H04B 17/309* (2015.01);
(Continued)

(58) Field of Classification Search
CPC ...... H04B 1/66; H04B 17/382; H04B 17/309; H04B 17/26; H04B 17/0085; H04B 17/29;
(Continued)

(56) References Cited

U.S. PATENT DOCUMENTS 7,463,595 B1 * 12/2008 Singhal ................. G06F 13/385
370/254
7,835,697 B2 * 11/2010 Wright ................. H04B 1/1027
370/445
(Continued)

FOREIGN PATENT DOCUMENTS

DE    10 2008 010 299 A1    3/2009
EP         1 890 507 A1     2/2008
(Continued)

OTHER PUBLICATIONS

International Preliminary Report on Patentability issued in corresponding application No. PCT/EP2011/065473 dated Nov. 8, 2012.
(Continued)

*Primary Examiner* — Kwang B Yao
*Assistant Examiner* — Hardikkumar Patel
(74) *Attorney, Agent, or Firm* — Carter, DeLuca, Farrell & Schmidt, LLP

(57) ABSTRACT

A measuring unit for measuring transmission parameters of a device under test, comprising a control unit, a transmitter and receiver unit and an evaluation unit. The transmitter and receiver unit is connected via a first connection to the control unit and via at least one transmission channel to the device under test. The device under test is connected via a second connection to the evaluation unit, wherein, for the measurement of the transmission parameters of the device under test, control-data packets and test-data packets are transmitted separately between the control unit and the evaluation unit, and wherein a transmission channel for the test-data packets can be disturbed in a targeted manner.

18 Claims, 5 Drawing Sheets

(51) Int. Cl.
*H04W 24/06* (2009.01)
*H04B 17/309* (2015.01)
*H04W 24/00* (2009.01)
*H04W 24/10* (2009.01)

(52) U.S. Cl.
CPC ........... *H04W 24/06* (2013.01); *H04L 43/087* (2013.01); *H04L 43/0847* (2013.01); *H04L 43/0864* (2013.01); *H04L 43/0894* (2013.01); *H04L 43/10* (2013.01); *H04W 24/00* (2013.01); *H04W 24/10* (2013.01)

(58) Field of Classification Search
CPC ........ H04B 17/15; H04N 19/61; H04N 19/44; H04N 19/86; G06T 5/002; G06T 5/009; H04M 9/08; H04M 9/082; H04M 3/42; H04M 1/663; H04M 3/2281; H04M 11/062; G06F 15/16; G06F 7/38; G06F 7/58; H04J 13/105; H03K 3/84; H03M 1/0641; H03M 7/04; H04W 16/24; H04W 24/02; H04W 24/06; H04W 52/48; H04L 65/1013; H04L 1/24; H04L 12/2697; H04L 43/50; H04L 12/26; H04Q 7/20
See application file for complete search history.

(56) References Cited

U.S. PATENT DOCUMENTS

| | | | | |
|---|---|---|---|---|
| 2003/0156548 A1* | 8/2003 | Sapp | ....................... | H04L 41/22 370/252 |
| 2003/0172177 A1 | 9/2003 | Kersley et al. | | |
| 2006/0229018 A1 | 10/2006 | Mlinarsky et al. | | |
| 2006/0239198 A1 | 10/2006 | Mlinarsky et al. | | |
| 2007/0091853 A1* | 4/2007 | Carlsson | ............. | H04W 52/262 370/335 |
| 2007/0254643 A1 | 11/2007 | Garcia et al. | | |
| 2008/0031136 A1* | 2/2008 | Gavette | ................... | H04L 12/66 370/235 |
| 2008/0293363 A1* | 11/2008 | Olgaard | ............. | H04B 17/0085 455/67.7 |
| 2009/0054001 A1* | 2/2009 | Westerberg | ......... | H04L 43/0858 455/67.11 |
| 2009/0116421 A1* | 5/2009 | Kawasaki | ............. | H04L 5/0053 370/312 |
| 2010/0046387 A1 | 2/2010 | Schwarz et al. | | |
| 2010/0113014 A1* | 5/2010 | Neumann | ............ | H04B 7/2675 455/426.1 |
| 2010/0293311 A1 | 11/2010 | Hahn | | |
| 2012/0244818 A1* | 9/2012 | Kyosti | ............... | G01R 29/0814 455/67.13 |

FOREIGN PATENT DOCUMENTS

| | | |
|---|---|---|
| GB | 2 352 129 A | 1/2001 |
| JP | 2007116329 A | 5/2007 |

OTHER PUBLICATIONS

"A GSM Digital Radio Communications Test Set", Microwave Journal, Horizon House Publications, Norwood, MA, US, vol. 40, No. 5, May 1, 1997.

International Search Report issued in corresponding application No. PCT/EP2011/065473 dated Dec. 8, 2011.

* cited by examiner

MEASURING UNIT AND A METHOD FOR MEASURING TRANSMISSION PARAMETERS OF A DEVICE UNDER TEST

The invention relates to a measuring unit and a method for measuring transmission parameters of a device under test. The measurement of transmission parameters preferably comprises a throughput measurement, a latency measurement and a round-trip-delay measurement (German: Umlaufzeitverzögerung), a jitter measurement and a packet-error-rate measurement, wherein the device under test is connected to the measuring unit via a simulated radio-transmission channel.

Portable electronic devices such as mobile telephones, organisers and laptops, but also including devices for stationary use, such as WLAN routers (English: wireless local area network; German: drahtloses lokales Netzwerk) now cover an increasingly large number of communications standards. For example, alongside the GSM standard (English: global system for mobile communications; German: System zur weltweiten drahtlosen Kommunikation) and the UMTS standard (English: universal mobile telecommunications system; German: universelle drahtloses Kommunikationssystem), new mobile telephones also support new communications standards for fast data transmissions such as WiMAX (English: worldwide interoperability for microwave access; German: Weltweite Kompatibilität far Mikrowellenzugriffe) or LTE (English: Long Term Evolution; German: Langzeitentwicklung). Accordingly, WLAN routers also support different communications standards such as IEEE 802.11a (English: Institute of Electrical and Electronics Engineers; German: als standardisierungs-Gremium fungierender Ingenieursverband) or IEEE 802.11n. Various transmission-parameter measurements are implemented to ensure that the electronic devices function in an error-free manner. In this context, one important index has so far been the bit-error rate. However, for the end user, the bit-error rate is not as relevant as the attainable data throughput. Moreover, a calculation of the maximum attainable data throughput on the basis of the bit-error rate is not possible.

A system for measuring the data throughput for a WLAN base station is known from JP 2007-116329 A. A measuring unit generates data packets and transmits them to the WLAN base station under test. In this context, the measuring unit counts the acknowledgement packets for the data packets received. The measuring unit calculates the data throughput on the basis of the data packets transmitted, the number of acknowledgement packets received and the size of the individual data packets. The disadvantage with JP 2007-116329 A is that, in order to calculate the data throughput, the acknowledgement packets must necessarily be received, and accordingly, the quality of the respective return channel necessarily influences the throughput measurement of the downlink path (English: downlink) or of the uplink path (English: uplink).

The object of the invention is thus to provide a measuring unit and a corresponding measurement method in order to measure the transmission parameters for a device under test as accurately as possible.

The object is achieved with regard to the measuring unit by the features of claim 1 and with regard to the method by the features of claim 10. The dependent claims specify advantageous further developments of the measuring unit according to the invention and the method according to the invention.

The measuring unit according to the invention for measuring transmission parameters of a device under test comprises a control unit, a transmitter and receiver unit and an evaluation unit. The transmitter and receiver unit is connected via a first connection to the control unit and via at least one transmission channel to the device under test. The device under test is connected via a second connection to the evaluation unit, wherein control-data packets and test-data packets are transmitted separately between the control unit and the evaluation unit in order to measure the transmission parameters of the device under test. In this context, a transmission channel for the test-data packets can be disturbed in a targeted manner.

It is particularly advantageous that the test-data packets and the control-data packets are transmitted separately from one another, and that, accordingly, only the transmission channel for the test-data packets can be disturbed in a targeted manner. As a result, for example, in the case of a throughput measurement, the throughput is obtained exclusively from the number of transmitted test-data packets, because additional control-data packets, which are necessary, for example, for the acknowledgement of the individual test-data packets, or which contain general configuration parameters, are transmitted without interference. Accordingly, high-precision results about the performance of the transmitter unit and the receiver unit of the device under test can be obtained. Furthermore, scenarios, to which the device under test will be exposed in its subsequent area of operation, can be simulated through the targeted disturbance of the transmission channel for the test-data packets.

In a first method step of the method according to the invention for measuring transmission parameters of a device under test, control-data packets are transmitted between the control unit and the evaluation unit. In a second method step, the transmission channel which is used for the transmission of test-data packets between the control unit and the evaluation unit is disturbed. In a third method step, test-data packets are transmitted between the control unit and the evaluation unit or the evaluation unit and the control unit.

It is particularly advantageous that the control-data packets are transmitted in a first method step of the method according to the invention. The transmission channel is not disturbed during the transmission of the control-data packets, which contain, for example, the number of test-data packets or the size of a test-data packet or the data rate, so that this information reaches the evaluation unit safely. The transmission channel, across which the test-data packets are transmitted, is disturbed in a targeted manner only in a second method step, so that various scenarios which may arise during operation can be simulated. The test-data packets are then transmitted via the disturbed transmission channel only in a third method step, in order to measure the transmission parameters of the device under test very accurately and independently from the transmission of the control-data packets.

Furthermore, in the case of the measuring unit according to the invention, it is advantageous if the control-data packets can be transmitted via an undisturbed transmission channel or via at least one further undisturbed connection. This can reduce the time until the transmission parameters are determined, because, for example, in the case of a connection-orientated protocol, acknowledgement packets can be transmitted between the control unit and the evaluation unit via an undisturbed transmission channel or via at least one further connection. In this case, the transmission channel for the test-data packets need not be matched during the measurement for the transmission of control-data packets.

Furthermore, in the case of the measuring unit according to the invention, it is advantageous if the control unit and the evaluation unit are embodied in a common computer system, or if the control unit and the evaluation unit are embodied jointly in the computer system of the transmitter and receiver unit. This reduces the quantity of components required, and the measurement of latency times and/or round-trip delays and/or jitter is also facilitated, because reference can be made back to a common clock.

It is additionally advantageous with the method according to the invention if the method provides a fourth method step in which a clock is started in the control unit or the evaluation unit as soon as test-data packets are transmitted or received, and if the clock in the control unit or the evaluation unit is stopped, in a fifth method step, as soon as test-data packets or acknowledgement-data packets are received. In a sixth method step, the time elapsed is added to a buffer unit, and the number of received test-data packets or acknowledgement-data packets is incremented. If the control unit starts a clock when it transmits test-data packets and stops the clock when it receives acknowledgement data packets, a latency measurement and/or a round-trip delay measurement and/or a jitter measurement can be implemented very easily. Conversely, the evaluation unit can determine the data throughput very simply if it starts the clock upon receipt of test-data packets and stops the clock upon receipt of further test-data packets and determines the time elapsed.

Finally, it is advantageous if, in a further method step, the method according to the invention transmits an instruction, as a control-data packet from the control unit or the evaluation unit to the evaluation unit or to the control unit, that all test-data packets have been transmitted. Such an instruction transmitted as a control-data packet would reach a receiver without interference and would ensure that running clocks are stopped and that the throughput can be calculated. Especially with a small number of transmitted test-data packets, the throughput measurement is accordingly much more accurate than if this instruction never reached the receiver or did so only after repeated transmission attempts because of the disturbed transmission channel.

Various embodiments of the invention are described by way of example below with reference to the drawings. Identical subject matters provide the same reference numbers. In detail, the corresponding figures of the drawings are as follows.

Figure 1:
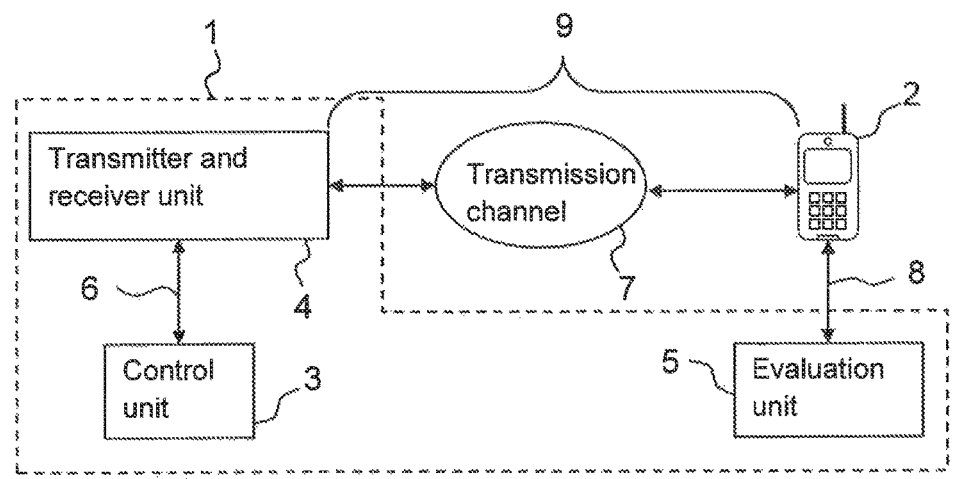
FIG. 1 shows a schematic circuit diagram of an exemplary embodiment of the measuring unit according to the invention.

FIG. 1 shows a schematic circuit diagram of an exemplary embodiment of the measuring unit 1 according to the invention for measuring transmission parameters of a device under test 2. The measuring unit 1 comprises a control unit 3, a transmitter and receiver unit 4 and an evaluation unit 5. The transmitter and receiver unit 4 is connected via a first connection 6 to the control unit 3. This first connection 6 can be, for example, a LAN connection. The transmitter and receiver unit 4 is further connected via a transmission channel 7 to the device under test 2. In turn, the device under test 2 is connected via a second connection 8 to the evaluation unit 5. This second connection 8 can be, for example, a LAN connection, a USB connection (English: universal serial bus; German: universelle serieller Bus) or a PCMCIA connection (English: personal computer memory card international association; German: Personalcomputerspeicherkarte, internationale Vereinigungskarte). Test-data packets and control-data packets are transmitted separately between the control unit 3 and the evaluation unit 5 via the first connection 6, the second connection 8 and the transmission channel 7. The transmission channel 7 is preferably a simulated radio-transmission channel, for example, according to the LTE standard or the WiMAX standard or the WLAN standard or the UMTS standard. In this context, the transmission channel 7 is simulated within the transmitter and receiver unit 4. Dependent upon the communications protocol, the transmitter and receiver unit 4 offers numerous optional settings for the signal parameters, for example, for the OFDM frame (English: orthogonal frequency division multiplex; German: orthogonaler Frequenzmultiplex) or for various modulation and coding methods. The transmission and receiver unit 4 provides a digital-signal processor and/or a central-processing unit on which the corresponding communications-protocol stack, for example, the WiMAX stack, is implemented.

Via the first connection 6, which is preferably a LAN connection, the transmitter and receiver unit 4 receives control-data packets and/or test-data packets and then assigns them using the WiMAX communications protocol to OFDM symbols and modulates these onto the individual carrier frequencies. An integrated amplifier unit within the transmitter and receiver unit 4 supplies the high-frequency data signal to a high-frequency output. The high-frequency output of the transmitter and receiver unit 4 is preferably connected to the device under test 2 via a cable connection 9. In the figures of the drawings, the cable connection 9 contains the transmission channel 7. This is shown only by way of explanation, because possible error sources, such as multiple fading (English: fading) or noise can be added to the data signal exclusively in the transmitter and receiver unit 4 and not in the cable connection 9 between the transmitter and receiver unit 4 and the device under test 2. The fading can be adjusted to simulate a device under test moving with the velocity of a pedestrian or a fast-moving vehicle.

The control unit 3 and the evaluation unit 5 in the exemplary embodiment according to the invention shown in FIG. 1 are embodied as independent computer systems. Both the control unit 3 and also the evaluation unit 5 comprise a pseudo-random noise generator which is used for generating the test data. The pseudo-random noise generator is preferably a linear-feedback shift register, of which the generator polynomial generates a sequence length, which corresponds approximately to the size of a payload data frame within a test-data packet.

The desired data rate for a throughput measurement is adjusted within the control unit 3 and within the evaluation unit 5, by first calculating the constant transmission time $t_z$, which specifies the delay between the individual test-data packets. This is implemented with the following formula, wherein $L_N$ denotes the length of the payload data (payload) of a test-data packet in bits, and $R_N$ denotes the desired data rate in MBits/s:

$$\Delta t_Z = \frac{L_{N[Bits]}}{R_N\left[\frac{MBit}{s}\right]} \text{ in } [\mu s]. \quad (1)$$

After this, the time which has elapsed between the transmissions of two successive test-data packets is checked and subtracted from the constant $t_z$. This difference is added to an actual delay parameter which was initialised at the start with zero, if one of the two values is positive. If the delay determined in this manner is greater than zero, the absolute value in microseconds is set as the delay, and no packet is sent. Accordingly, jitter in the data rate can be compensated in each iteration. Dependent upon whether the downlink (data transmission from the transmitter and receiver unit 4 to the device under test 2) or the uplink (data transmission from the device under test 2 to the transmitter and receiver unit 4) of the device under test 2 is to be tested, the test-data packets are generated and transmitted either in the control unit 3 (in the case of a downlink measurement) or in the evaluation unit 5 (in the case of an uplink measurement).

Control-data packets and test-data packets are exchanged between the control unit 3 and the evaluation unit 5 via the transmitter and receiver unit 4 and the device under test 2. The control-data packets are configuration data with which the evaluation unit 5 is correctly adjusted for the subsequent measurement. Control-data packets are, for example, the size of the test-data packets, the data rate, the generator polynomial to be used, the number of simultaneous datastreams, the connecting port to be opened for each datastream or an instruction which communicates that the measurement is complete and which requests a test protocol. Acknowledgement-data packets (ACK) are also preferably sent as control-data packets.

However, during the transmission of these control-data packets, the transmission channel 7 should not be disturbed. This can be ensured on the basis of various methods. In FIG. 1, the configuration data are preferably transmitted before the actual measurement of the transmission parameters. As soon as the control unit 3 and the evaluation unit 5 have been correctly configured, the control unit 3 communicates to the transmitter and receiver unit 4 that the transmission channel should be disturbed. Dependent upon whether the uplink (uplink) or the downlink (downlink) of the device under test 2 is to be tested, the respectively other path of the transmission channel 7 is preferably not disturbed. This ensures that the acknowledgement-data packets (ACK) can be transmitted in an undisturbed manner. After the measurement of transmission parameters has been completed, the control unit 3 communicates to the transmitter and receiver unit 4 that the transmission channel 7 should now no longer be disturbed. Following this, the control unit 3 transmits an instruction to the evaluation unit 5, so that the latter prepares the test protocol and sends it to the control unit 3.

Figure 2:
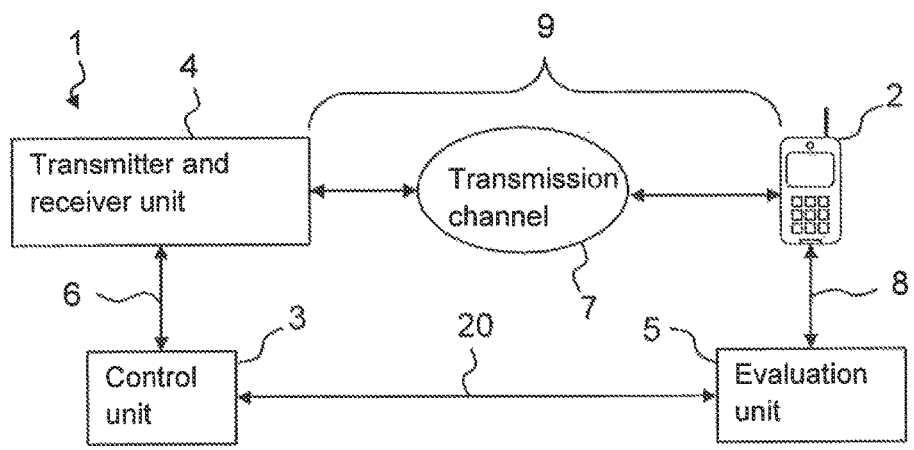
FIG. 2 shows a schematic circuit diagram of a further exemplary embodiment of the measuring unit according to the invention.

FIG. 2 shows a schematic circuit diagram of a further exemplary embodiment of the measuring unit 1 according to the invention. The functioning of the measuring unit 1 according to the invention largely corresponds to that from FIG. 1, for which reason, reference is made to the corresponding place in the description. By way of difference from the measuring unit 1 from FIG. 1, wherein the control-data packets are transmitted via an undisturbed transmission channel 7, in the case of the measuring unit 1 from FIG. 2, the control-data packets are transmitted between the control unit 3 and the evaluation unit 5 via a further undisturbed connection 20. This further connection 20 is a direct connection, preferably, for example, a LAN connection, between the control unit 3 and the evaluation unit 5. Instead of a LAN connection, this can also be a serial connection or a CAN interface (English: controller area network; German. Feldbussystem). One advantage is that the transmission channel 7 can also be disturbed during the transmission of control-data packets, so that no time is wasted while the disturbed transmission channel 7 is being switched to an undisturbed transmission channel 7. Moreover, as a result, full-duplex measurements of connection-orientated protocols, such as TCP (English: transmission control protocol; German: Übertragungssteuerungsprotokoll) are also allowed, because the acknowledgement-data packets can be transmitted via the further connection 20, which is once again associated with a time-saving.

Figure 3:
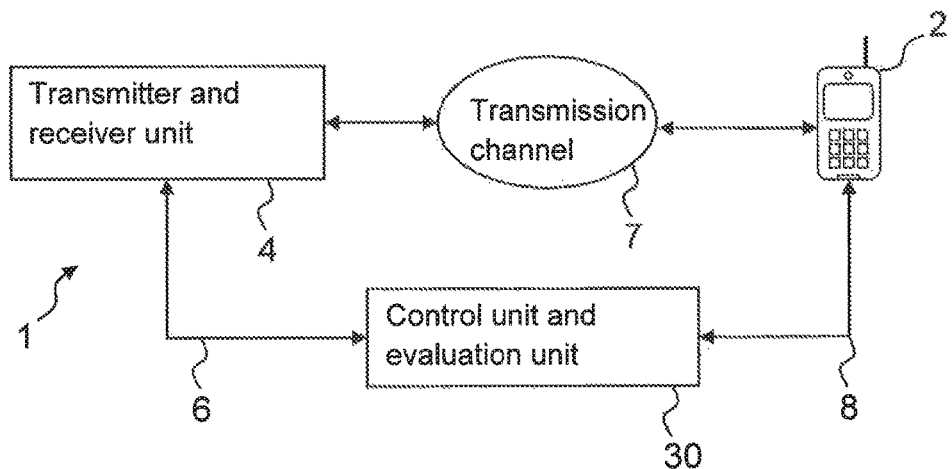
FIG. 3 shows a schematic circuit diagram of a further exemplary embodiment of the measuring unit according to the invention.

FIG. 3 shows a schematic circuit diagram of a further exemplary embodiment of the measuring unit 1 according to the invention. By way of difference from the exemplary embodiment according to the invention shown in FIG. 2, the control unit 3 and the evaluation unit 5 in this case are integrated in a common computer system 30. The computer system 30, which contains the control unit 3 and the evaluation unit 5, is connected to the transmitter and receiver unit 4 via the first connection 6 and to the device under test 2 via the second connection 8. It is particularly advantageous that both the control unit 3 and also the evaluation unit 5 can access the same clock within the computer system 30. This is particularly advantageous in the case of latency measurements and jitter measurements, because synchronisation of different clocks is not required. The computer system 30 preferably provides at least two LAN interfaces, one of which is preferably connected directly to the transmitter and receiver unit 4 and the other preferably directly to the device under test 2.

Figure 4:
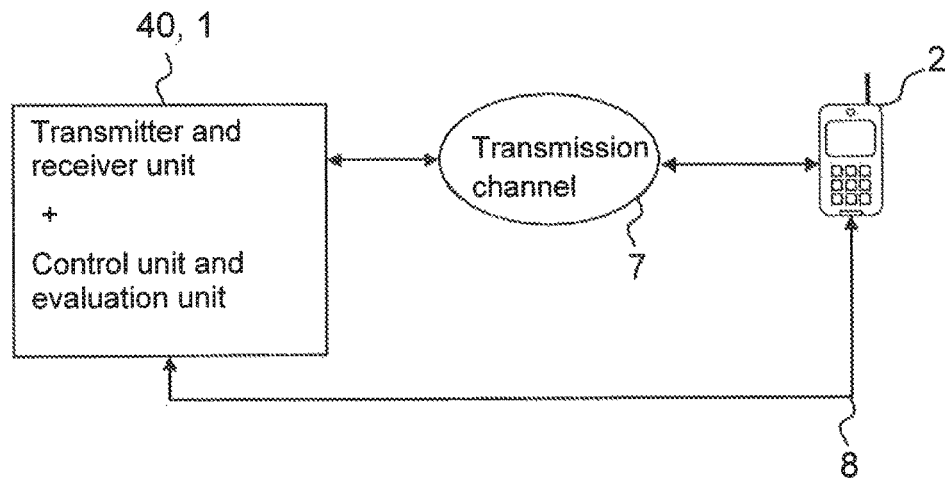
FIG. 4 shows a schematic circuit diagram of a further exemplary embodiment of the measuring unit according to the invention.

FIG. 4 shows a schematic circuit diagram of a further exemplary embodiment of the measuring unit 1 according to the invention. By contrast with the exemplary embodiment according to the invention from FIG. 3, the control unit 3 and the evaluation unit 5 are embodied jointly in the computer system 40 of the transmitter and receiver unit 4. The computer system 40 of the transmitter and receiver unit 4, with the control unit 3 and the evaluation unit 5, is connected to the device under test 2 via the transmission channel 7 and via the second connection 8. It is particularly advantageous that the number of computer systems required is minimised, thereby keeping down the cost for the measuring unit 1.

Figure 5:
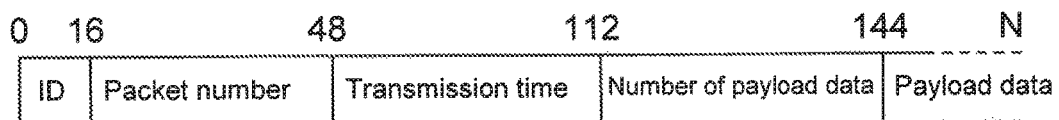
FIG. 5 shows a possible structure of a packet for the test data.

FIG. 5 shows an exemplary structure of a packet for the test data. Within this description, the terms "test data" and "test-data packets" are used in such a manner that the test data represent the payload data within a test-data packet. For example, the first 16 bits of the packet for the test data are reserved for the identification data. This region of the structure for the test data determines the stream (English: stream) to which the packet belongs. The control unit 3 and the receiver unit 5 allow test-data packets to be exchanged via several parallel streams at different connecting ports of various communications protocols, such as TCP of UDP (English: user datagram protocol; German: Benutzer Datagramm Protokoll).

The second segment of the packet for the test data contains the packet number. The packet number is represented by a 32-bit value. The packet number of every transmitted test-data packet is preferably incremented by one by comparison with the packet number of the preceding test-data packet. Before the start of the measurement of transmission parameters, the evaluation unit 5 is notified through the configuration parameters regarding how many test-data packets are to be transmitted. The maximum number of test-data packets to be transmitted and/or received is therefore known both to the control unit 3 and also to the evaluation unit 5.

In a third segment of the packet for the test data, the transmission time is buffered in a 64 bit value. This transmission time is preferably the counter status, at the time when the test-data packet is generated, of a counter component realised in hardware within the transmitter unit 3 or the evaluation unit 5, which all currently available computer systems provide. As will be explained in greater detail below, this information is of great importance for calculating the latency. A precise clock time can also be buffered from a clock.

A fourth 32-bit segment of the packet for the test data contains the length of the test data or respectively of the payload data within the test-data packet.

A fifth segment of the packet for the test data finally contains the test data to be transmitted, which are preferably generated by means of the pseudo-random noise generator.

After it has been generated, the exemplary test-data packet illustrated in FIG. 5 is embedded into the structure for the payload data (payload part), for example, of a TCP packet or, for example, of a UDP packet.

Figure 6A:
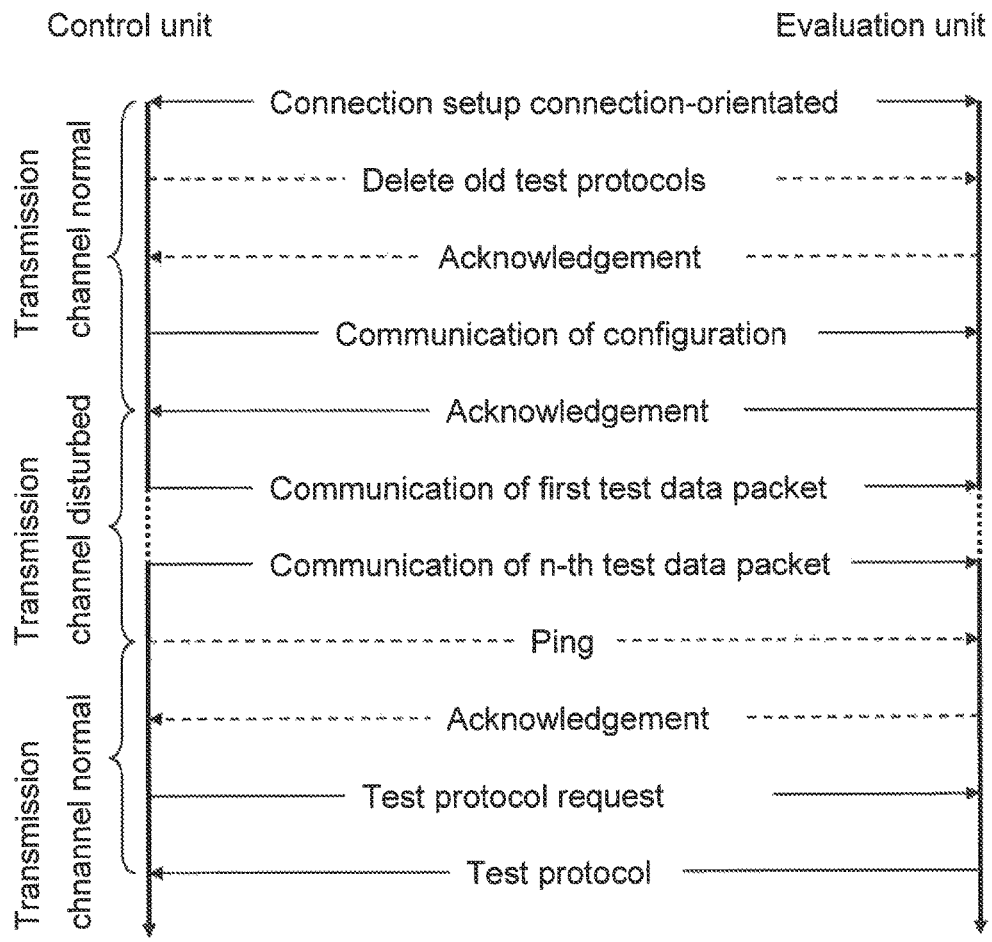
FIG. 6A shows an exemplary sequence protocol for a connectionless measurement.

FIG. 6A shows an exemplary sequence protocol of a connectionless measurement. At the start, a connection-orientated connection setup, such as a TCP connection is implemented. This connection is used for the configuration of the evaluation unit 5 by the control unit 3. Optionally, already existing test protocols with transmission parameters from previous devices under test 2 can also be deleted. The transmission of such an instruction is acknowledged on the basis of the connection-orientated connection by transmitting acknowledgement-data packets (ACK data; English: Acknowledge). Following this, the configuration parameters are transmitted from the control unit 3 to the evaluation unit 5. The receipt of the configuration parameters is also acknowledged, again by the transmission of acknowledgement-data packets. Until this time, provided the sequence protocol is based upon the exemplary embodiment according to the invention of the measuring unit 1 from FIG. 1, the transmission channel 7 is not disturbed. Following this, the transmission channel 7 is disturbed in a targeted manner by the addition of multiple fading and/or noise. Following this, 1 to n test-data packets are transmitted, wherein the following applies for n: n∈N∩n>1. The test-data packets, which are, however, embedded in a TCP packet or UDP packet, provide the structure from FIG. 5.

In FIG. 6A, the test-data packets are embedded in a UDP packet, and a transmission of acknowledgement-data packets does not take place. As explained, the test-data packets are delayed before transmission in order to achieve a pre-determined data rate. The individual test-data packets can also be associated with different streams (English: streams). The test-data packets can also be embedded in a TCP packet, wherein, in this case, acknowledgement-data packets are transmitted via an undisturbed transmission channel 7 or a further connection 20. In the case of a downlink (English: downlink), the uplink (English: uplink) is not disturbed. If the measuring unit 1 according to the invention is realised according to one of the exemplary embodiments from one of FIG. 2, 3 or 4, test-data packets can also be simultaneously transmitted from the evaluation unit 5 to the control unit 3 (full duplex). This achieves a further significant reduction of the testing time.

After the completion of the throughput measurement, the interference of the transmission channel 7 is cancelled, and the control unit 3 optionally checks whether the evaluation unit 5 can be reached. Following this, the control unit 3 communicates an instruction to the evaluation unit 5 that the latter should prepare and transmit a test protocol with the measured transmission parameters. If the measuring unit 1 according to the invention is set up according to one of the exemplary embodiments from one of FIG. 2, 3 or 4, the interference on the transmission channel 7 need not be cancelled. In this case, the instruction requesting the test protocol is transmitted via a further connection 20, which is shown in FIGS. 3 and 4 in the computer system 30 and 40.

If an uplink measurement (uplink) is implemented, the evaluation unit 5 communicates an instruction to the control unit 3 that the measurement has been completed. The control unit 3 then itself generates a test protocol, wherein round-trip-delayed times which have optionally also been measured, are called up by the evaluation unit 5.

Figure 6B:
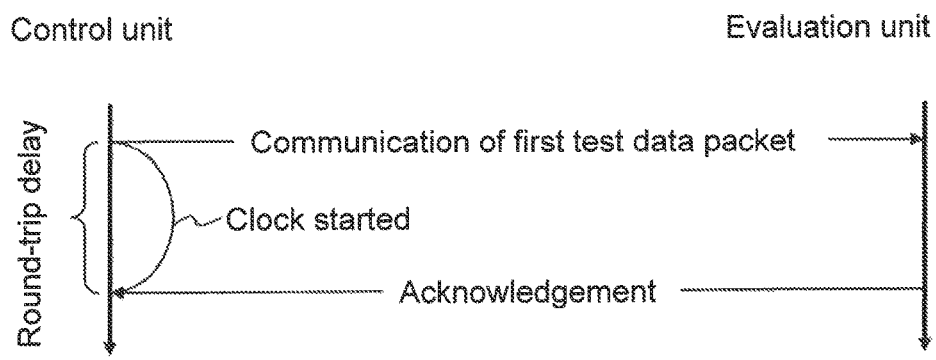
FIG. 6B shows an exemplary sequence protocol for the measurement of the round-trip delay.

FIG. 6B shows an exemplary sequence protocol for measuring the round-trip delay for a downlink measurement in the device under test 2. For this purpose, the test-data packets are embedded in a connection-orientated communications protocol, such as TCP. At the start, such a test-data packet is transmitted from the control unit 3 to the evaluation unit 5. As soon as the test-data packet has been transmitted, a clock is started, or the current value of a counter unit is buffered. As soon as the data packet has been received by the evaluation unit 5, acknowledgement data (ACK) are returned. As soon as these acknowledgement data have been received by the control unit 3, the clock is stopped or a difference is formed between the current value of the counter unit and the buffered, previous value of the counter unit. The time difference from the transmission of the test-data packet to the arrival of the acknowledgement-data packet is also referred to as the round-trip delay (Rundlaufverzögerung). The acknowledgement-data packets in this context can be transmitted both via an undisturbed return channel of the transmission channel 7, and also via the further connection 20. If a test-data packet is not received, the clock is automatically stopped upon the transmission of the following test-data packet. In this case, a packet-error rate, by means of which the quality of the device under test 2 is also described, can also be calculated.

With this configuration, the data throughput achieved can also be calculated directly by the control unit 3. If p acknowledgement data are received from n transmitted test-data packets, where n≥p, the data throughput is calculated as follows:

$$D = \frac{L_N \cdot p}{T_{ges}} \quad (2)$$

wherein $L_N$ represents the length of the payload data and $T_{ges}$ the duration of the transmission. If an uplink measurement (uplink) is implemented, the round-trip delay and optionally the data throughput are measured by the evaluation unit 5.

Figure 6C:
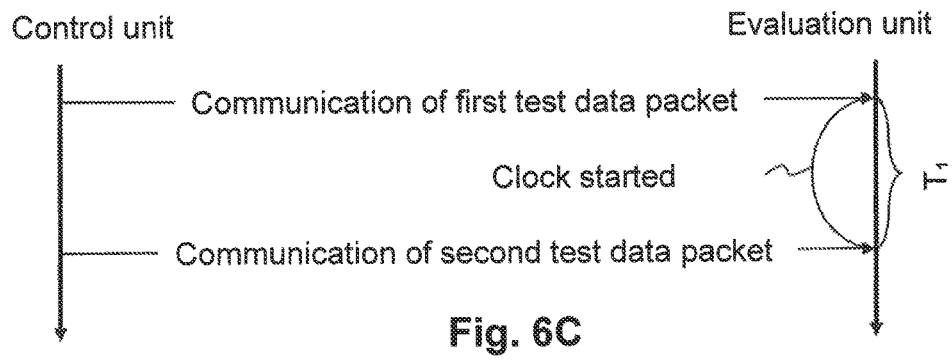
FIG. 6C shows an exemplary sequence protocol for the measurement of the throughput.

FIG. 6C shows an exemplary sequence protocol for measuring the data throughput using a connectionless connection protocol, such as UDP. As soon as the evaluation unit 5 receives a test-data packet, a clock is started or the current value of a counter unit is buffered. As soon as a further test-data packet is received by the evaluation unit 5, the clock is stopped or a difference is formed between the previous buffered value of the counter unit and the current value of the counter unit. At the same time, a new clock is started, or a new value of the counter unit is buffered. As soon as the evaluation unit receives the instruction that the measurement has been completed, and that the test protocol is to be prepared, the last clock is stopped or the last difference is formed. The data throughput is then calculated as follows:

$$D = \frac{L_N \cdot p}{\sum_{i=1}^{p} T_i} \quad (3)$$

$$D = \frac{L_N \cdot p}{T_{ges}},$$

wherein $L_N$ denotes the length of the payload data, p denotes the number of test-data packets received and $T_i$ denotes the time between the individual received test-data packets. At the start, the configuration data, which also contain the total number n of test-data packets to be transmitted, were communicated to the evaluation unit 5. The packet-error rate can be determined on the basis of the number of test-data packets p received.

Figure 6D:
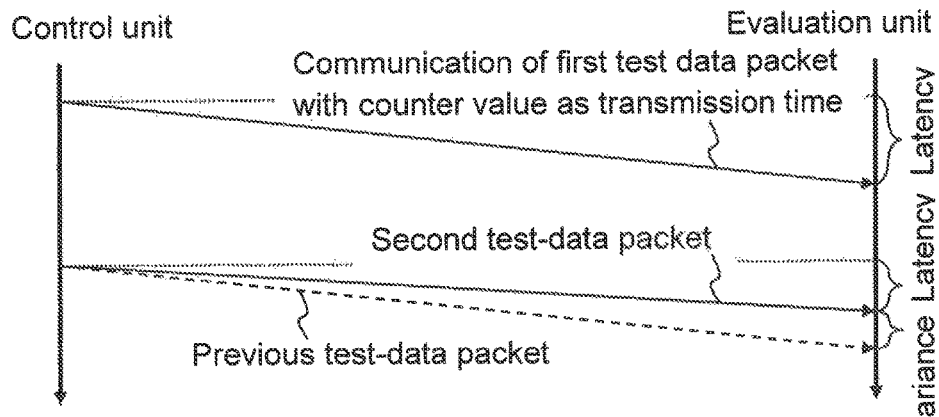
FIG. 6D shows an exemplary sequence protocol for the measurement of the latency and the jitter.

FIG. 6D shows an exemplary sequence protocol for measuring the latency and the jitter (Schwankungen) using a connectionless connection protocol, such as UDP. As soon as the control unit 4 has generated the test-data packet, the current value of a clock or the current value of a counter unit is buffered in the structure for the transmission time within the test-data packet. The evaluation unit 5 is preferably integrated in the same computer system 30, 40 as the control unit 4, so that the evaluation unit can access the same clock or the same counter unit as the control unit 4. As an alternative, a clock or a counter unit of the evaluation unit 5 must be synchronised in advance with the clock or the counter unit of the control unit 3. As soon as the evaluation unit 5 receives the test-data packet, the latency can be determined on the basis of the time difference or on the basis of the counter difference. If a second test-data packet is then transmitted, its latency, which can differ from the latency of the first test-data packet, can also be determined Finally, the mean value for all latencies can be formed and the variance (deviation from the mean value), or respectively the jitter can be determined. The same also applies for the uplink measurement (English: uplink), when test-data packets are transmitted from the evaluation unit 5 to the control unit 3.

Figure 7:
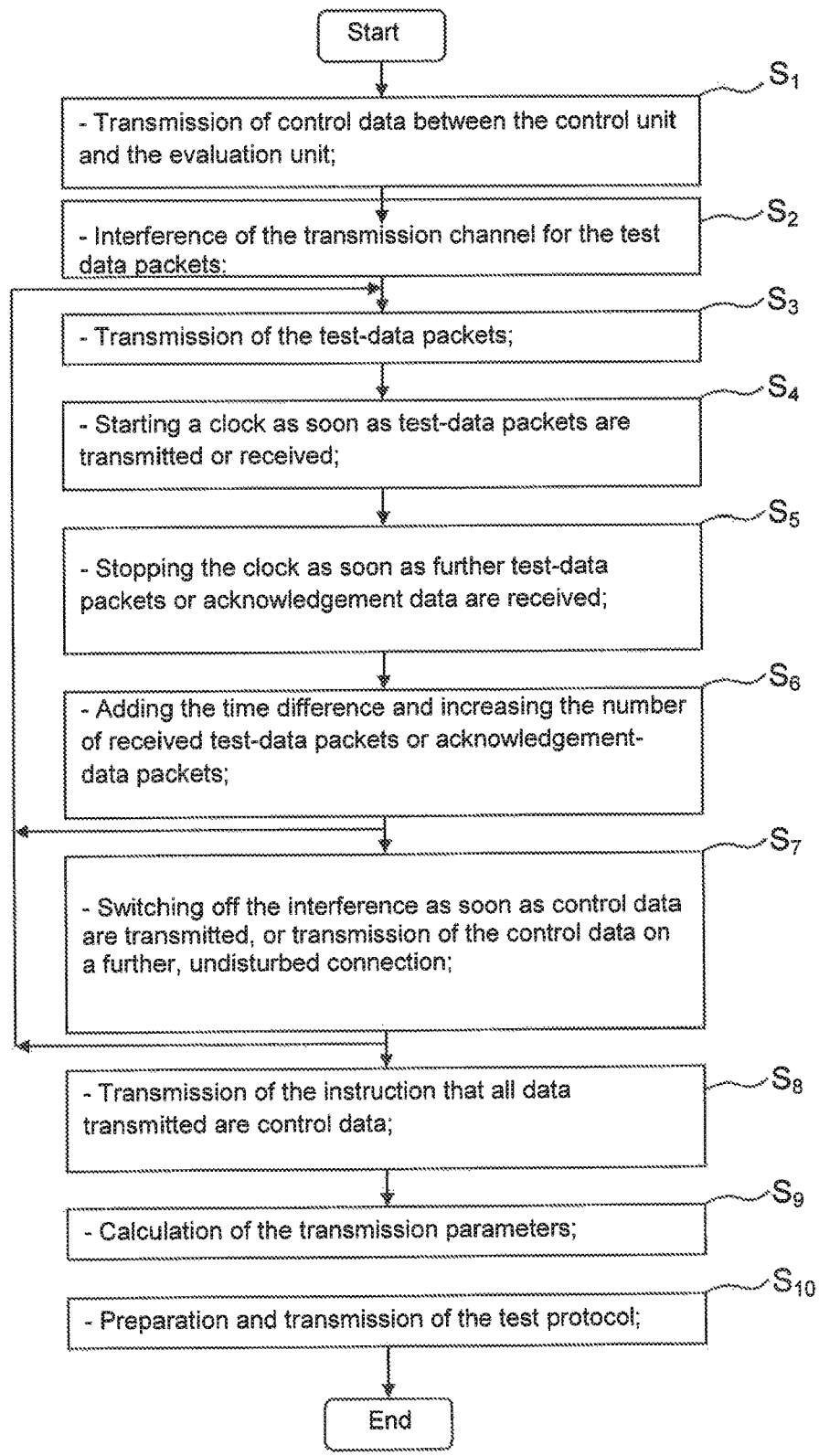
FIG. 7 shows a flow chart for an exemplary embodiment of the method according to the invention for measuring transmission parameters of a device under test.

FIG. 7 shows a flow chart for an exemplary embodiment of the method according to the invention for measuring the transmission parameters of a device under test 2. In a first method step $S_1$, control-data packets are transmitted between the control unit 3 and the evaluation unit 5. In this context, the control unit 3 communicates configuration parameters for the subsequent measurement of transmission parameters to the evaluation unit 5. The configuration parameters include, for example, the number of test-data packets to be transmitted, the data rate, the number of datastreams, the type of communications protocol to be used, the type of generator polynomial, and so on. These control-data packets are preferably transmitted via a connection-orientated communications protocol, such as TCP. In this case, the transmission channel 7 is not disturbed, or the control-data packets are exchanged between the control unit 3 and the evaluation unit 5 via the further connection 20. In a second method step $S_2$, the transmission channel 7, which is used for the transmission of the test-data packets between the control unit 3 and the evaluation unit 6, is disturbed in a targeted manner. Accordingly, interference such as multiple fading or noise can be simulated.

In a further method step $S_3$, the test-data packets are transmitted either between the control unit 3 and the evaluation unit 5 or between the evaluation unit 5 and the control unit 3, dependent upon whether the downlink (English: downlink) or the uplink (English: uplink) is to be measured. In this context, the test-data packets can be embedded in TCP packets or UDP packets. The transmission time can also be buffered within the structure of the test-data packet. For this purpose, the current time of the clock or the current value of the counter unit is buffered in the corresponding 64-bit structure within the test-data packet.

In a fourth method step $S_4$, a clock is started in the control unit 3 or the evaluation unit 5, or the value of a counter unit is buffered as soon as test-data packets are transmitted or received. The description for the drawings associated with FIG. 6B explains the advantages achieved if a clock is started in the unit 3, 5, which transmits the test-data packets in order to calculate the round-trip delay on the basis of the acknowledgement-data packet. FIG. 6C illustrates the advantages if the clock is started at the receiver end of the test-data packets upon receipt of a test-data packet. In addition to a time, the value of a counter unit, which is incremented with a fixed clock pulse, can also be buffered.

In a further method step $S_5$, the clock is stopped as soon as further test-data packets or an acknowledgement-data packet are received. In this case, FIG. 6B shows how the round-trip delay can be calculated. FIG. 6C shows how the data-throughput is determined, and FIG. 6D illustrates how the latency can be determined, and how the jitter can be determined from the latency.

In a sixth method step $S_6$, the time difference obtained from the last but one test-data packet received to the last test-data packet received, is added to the previously added time differences. Moreover, the number of received test-data packets or optionally acknowledgement-data packets is increased by one. The aim here is to count the number of test-data packets received and to register the time required until the test-data packets have been received, so that the data throughput can then be calculated via the disturbed transmission channel 7. After the completion of the sixth method step $S_6$, the third method step $S_3$ can be repeated by transmitting new test-data packets.

If no further test-data packets are to be transmitted, or if the test-data packets are to be transmitted using a connection-orientated communications protocol, such as TCP, the interference on the transmission channel 7 is switched off in a seventh method step $S_7$, or the control-data packets are transmitted on a further undisturbed connection 20. With the use of a connection-orientated protocol, the control-data packets can be the acknowledgement-data packets with which the test-data packets are acknowledged. If further test-data packets are to be transmitted using a connection-orientated protocol, method step $S_3$ can be repeated.

If no further test-data packets are to be transmitted, method step $S_8$ is implemented, in which an instruction is transmitted from the control unit 3 to the evaluation unit 5 or from the evaluation unit 5 to the control unit 3 that all test-data packets have been sent.

In a ninth method step $S_9$, the transmission parameters are calculated. The data throughput is determined with reference to equation (3) according to which the number of transmitted bits is determined and divided by the total time. The calculation of the round-trip delay for a test-data packet is explained in the description for the drawings of FIG. 6B. After completion of the measurement, all of the round-trip delay values are averaged. The same also applies for the calculation of the latency and jitter. The error-packet rate is calculated from the ratio of the test-data packets received to the initially anticipated, maximum number of test-data packets to be received.

In a final method step $S_{10}$, the test protocol is prepared by the control unit 3 and/or the evaluation unit 5 and optionally transmitted from the evaluation unit 5 to the control unit 3. The control unit optionally combines both test protocols and displays them on a screen unit, which is not illustrated.

Within the scope of the invention, all of the features described and/or illustrated can be combined with one another as required.

The invention claimed is:

1. A measuring unit for measuring transmission parameters of a device under test, comprising:
   a control unit;
   a transmitter and receiver unit; and
   an evaluation unit,
   wherein the transmitter and receiver unit is connected via a first connection to the control unit and via at least one transmission channel to the device under test,
   wherein acknowledgement-data packets are transmitted as control-data packets,
   wherein the device under test is connected via a second connection to the evaluation unit,
   wherein, for the measurement of the transmission parameters of the device under test, the control-data packets and test-data packets are transmitted separately between the control unit and the evaluation unit,
   wherein the at least one transmission channel for the test-data packets can be disturbed in a targeted manner,
   wherein, dependent upon whether an uplink path or a downlink path of the device under test is to be tested, a respective other path in the at least one transmission channel is not disturbed, so that the acknowledgement-data packets can be transmitted in an undisturbed manner,
   wherein the test-data packets are delayed before transmission,
   wherein the control unit and the evaluation unit access a same clock,
   wherein no time is wasted while the disturbed transmission channel is being switched to an undisturbed transmission channel,
   wherein full-duplex measurements of connection-orientated protocols are allowed, and
   wherein a segment of one of the test-data packets contains the test data to be transmitted, which is generated by a pseudorandom noise generator, wherein the pseudorandom noise generator is a linear-feedback shift register.

2. The measuring unit according to claim 1, wherein the at least one transmission channel is a simulated radio-transmission channel.

3. The measuring unit according to claim 1, wherein the at least one transmission channel is not disturbed during the transmission of the control-data packets.

4. The measuring unit according to claim 1, wherein interference, such as multiple fading and/or noise, can be added to the transmission channel.

5. The measuring unit according to claim 1, wherein the control-data packets can be transmitted via the undisturbed transmission channel or via at least one further undisturbed connection.

6. The measuring unit according to claim 5, wherein the at least one further undisturbed connection is a direct connection between the control unit and the evaluation unit.

7. The measuring unit according to claim 1, wherein the measurement of the transmission parameters is selected from the group consisting of a throughput measurement, a latency time measurement, a round-trip-delay measurement, a jitter measurement, a packet-error rate, and combinations thereof.

8. The measuring unit according to claim 1, wherein the control unit and the evaluation unit are embodied in a common computer system.

9. A method for measuring transmission parameters of a device under test with a measuring unit, which comprises a control unit, a transmitter and receiver unit, and an evaluation unit, wherein the transmitter and receiver unit is connected via a first connection to the control unit and via a transmission channel to the device under test, wherein acknowledgement-data packets are transmitted as control-data packets, wherein the device under test is connected via a second connection to the evaluation unit, and wherein, dependent upon whether an uplink path or a downlink path of the device under test is to be tested, a respective other path in the transmission channel is not disturbed, so that the acknowledgement-data packets can be transmitted in an undisturbed manner, the method comprising:
   transmitting control-data packets between the control unit and the evaluation unit;
   targeting interference of the transmission channel which is used for transmitting test-data packets between the control unit and the evaluation unit; and
   transmitting test-data packets between the control unit and the evaluation unit,
   wherein the test-data packets are delayed before transmission,
   wherein the control unit and the evaluation unit access a same clock,
   wherein no time is wasted while the disturbed transmission channel is being switched to an undisturbed transmission channel,
   wherein full-duplex measurements of connection-orientated protocols are allowed, and
   wherein a segment of one of the test-data packets contains the test data to be transmitted, which is generated by a pseudorandom noise generator, wherein the pseudorandom noise generator is a linear-feedback shift register.

10. The method according to claim 9, further comprising:
   starting a clock in the control unit or the evaluation unit, as soon as test-data packets are transmitted or received;
   stopping the clock in the control unit or the evaluation unit, as soon as further test-data packets or acknowledgement-data packets are received; and
   adding the time elapsed to a buffer unit, and incrementing the number of received test-data packets or acknowledgement-data packets.

11. The method according to claim 9, further comprising:
switching the interference off as soon as control-data packets are transmitted, or transmitting the control-data packets on a further, undisturbed connection between the control unit and the evaluation unit.

12. The method according to claim 9, further comprising:
transmitting an instruction, as a control-data packet, that all test-data packets have been transmitted from the control unit to the evaluation unit or from the evaluation unit to the control unit.

13. The method according to claim 12, further comprising:
calculating the transmission parameters with the control unit or the evaluation unit.

14. The method according to claim 13, further comprising:
preparing a test protocol by the control unit.

15. The measuring unit according to claim 1, wherein the control unit and the evaluation unit are embodied jointly in a computer system of the transmitter and receiver unit.

16. The measuring unit according to claim 2, wherein the transmission channel is a simulated radio-transmission channel according to the Long Term Evolution (LTE) standard, the Worldwide Interoperability for Microwave Access (WiMAX) standard, the Wireless Local Area Network (WLAN) standard, or the Universal Mobile Telecommunications System (UMTS) standard.

17. The method according to claim 13, wherein the transmission parameters are selected from the group consisting of data throughput, latency, round-trip delay, jitter, packet-error rate, and combinations thereof.

18. The method according to claim 13, further comprising:
preparing a test protocol; and
communicating the test protocol to the control unit as a control-data packet by the evaluation unit.

* * * * *